Figure 1:
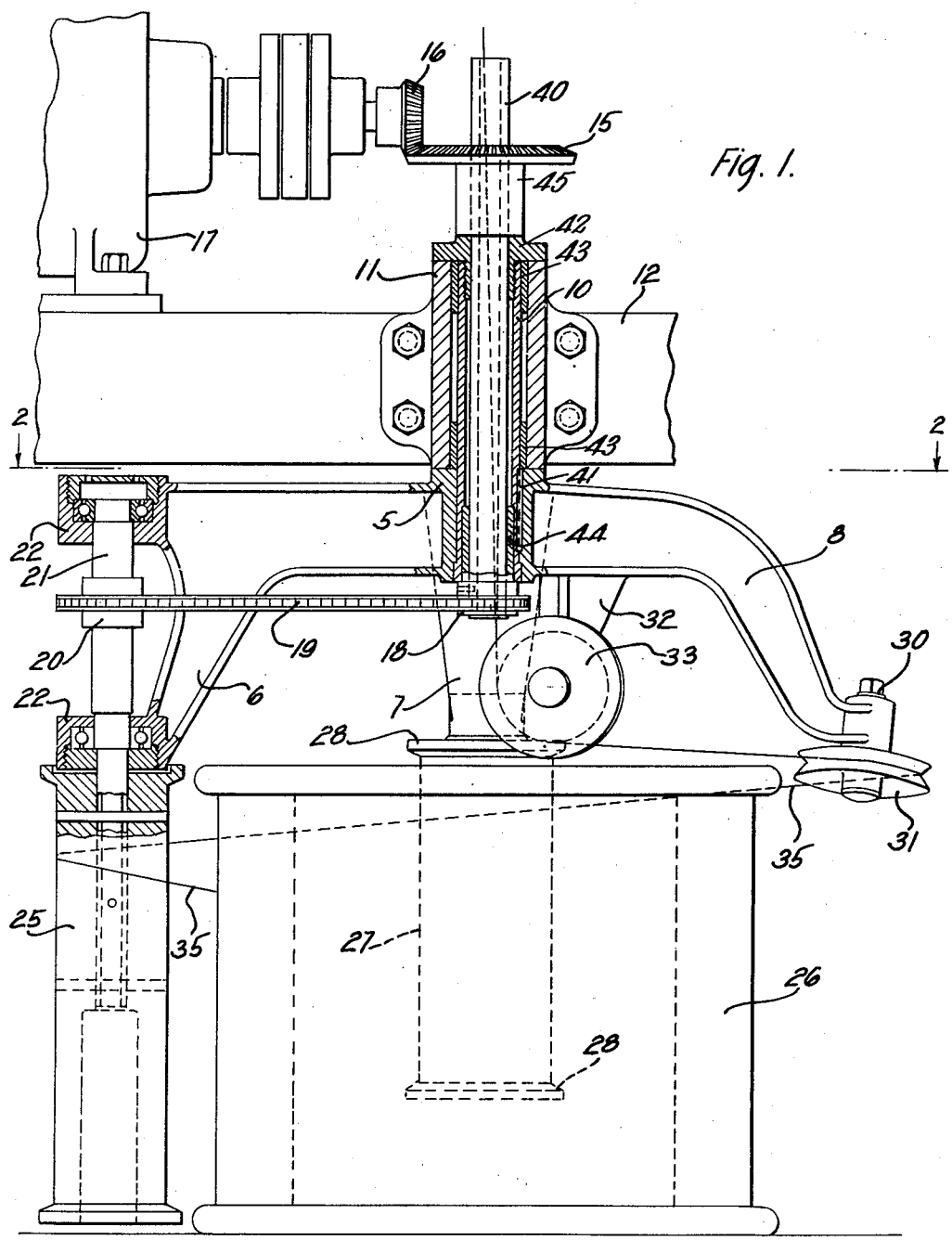

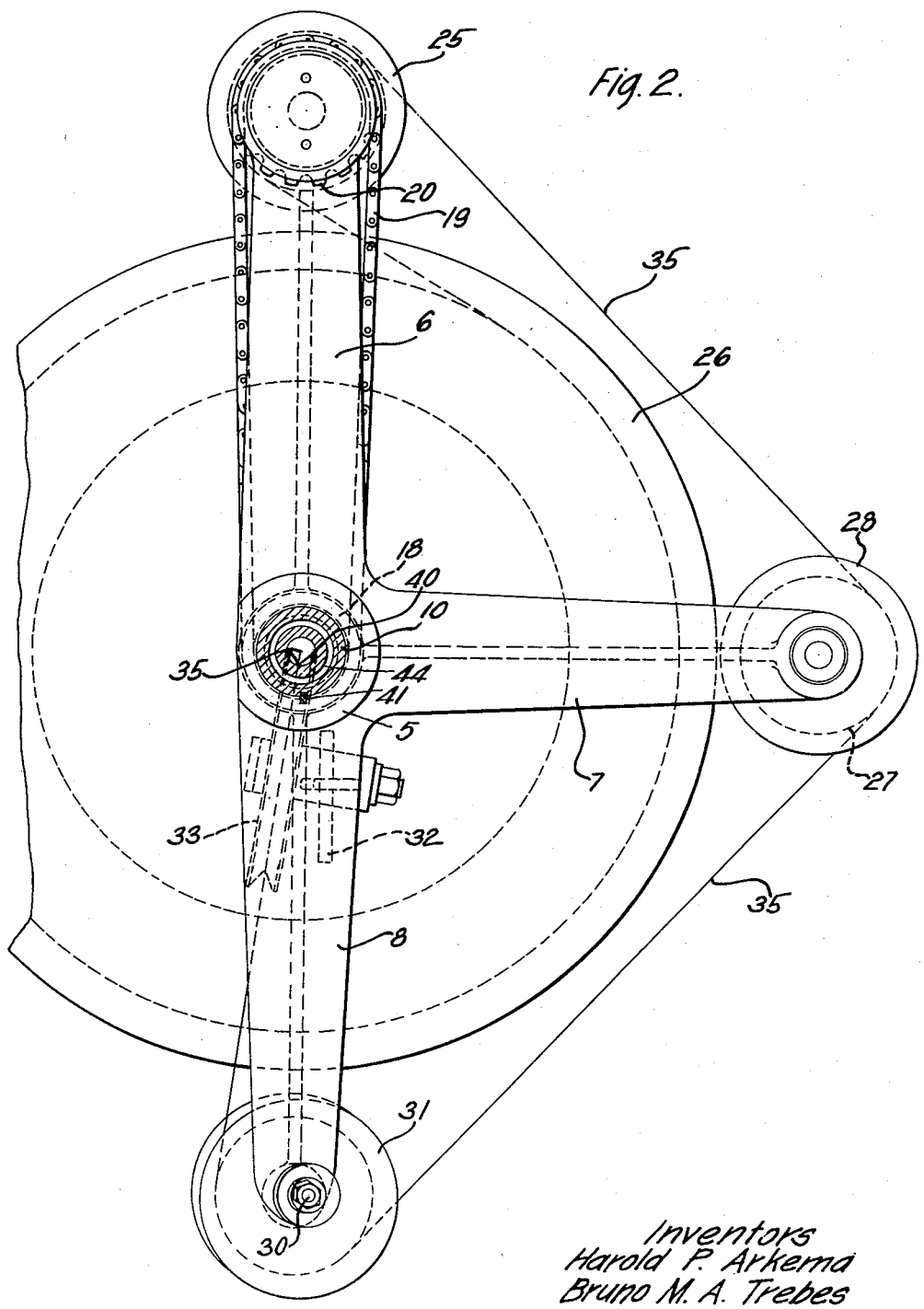

Patented Apr. 24, 1934

1,955,785

UNITED STATES PATENT OFFICE 1,955,785

STRAND HANDLING APPARATUS

Harold P. Arkema, Chicago, and Bruno M. A. Trebes, Berwyn, Ill., assignors to Western Electric Company, Incorporated, New York, N. Y., a corporation of New York Application September 30, 1929, Serial No. 396,349

8 Claims. (Cl. 242—128)

This invention relates to a strand handling apparatus, and more particularly to an apparatus for unwinding a strand from a stationary supply reel.

The principal object of the invention is to provide an efficient apparatus of simple construction for expediting the unwinding of strand material.

One embodiment of the invention contemplates the provision of an apparatus particularly well adapted for unwinding strand from a vertically positioned stationary supply reel, whereby the strand passes around a positively rotated vertical drum and a freely rotatable cylinder parallel therewith and spaced 90° therefrom, both carried by arms of a flyer rotating around the supply reel. The strand passes from the rotatable cylinder over a sheave positioned at an angle on another arm of the flyer diametrically opposite the drum, and thence up through a central opening in the flyer to a strand working apparatus.

Other features and advantages of the invention will be apparent when taken in conjunction with the accompanying drawings, in which Fig. 1 is a fragmentary elevational view, partly in section, of an apparatus embodying the invention, and Fig. 2 is a fragmentary plan, sectional view taken on line 2—2 of Fig. 1.

Referring now to the drawings in which like reference numerals designate similar parts throughout the disclosure, the numeral 5 designates a flyer which has three arms 6, 7, and 8 positioned approximately 90° apart and an upright hollow shaft 10 rigidly secured thereto by a key 41 and rotatably mounted in a journal 11 secured to a frame 12 of a strand working apparatus. A collar 42 is secured to the upper end of the shaft 10 and is supported by the upper end of the journal 11, being freely rotatable thereon and thus supporting the shaft 10 and the flyer 5. The shaft 10 is spaced from the interior of the journal 11 and rotates in a pair of bushings 43—43 positioned in the upper and lower ends of the journal 11. A second hollow shaft 40 is positioned coaxially within the shaft 10 and collar 42 and is freely rotatable therein. This shaft 40 is journalled in the collar 42 and in a bushing 44 secured within the lower end of the shaft 10. The shaft 40 is supported by a collar 45 rigidly secured thereto and resting rotatably on the collar 42. The collar 45 in turn supports a bevel gear 15 also rigidly secured to the shaft 40. The gear 15 meshes with a bevel gear 16 driven by a variable speed electric motor 17 mounted on the frame 12 and the lower end of the shaft 40 has secured thereto a sprocket wheel 18. This sprocket wheel drives a sprocket chain 19 for actuating another sprocket wheel 20 rigidly secured to a vertical spindle 21 depending from and suitably journaled in the extremities 22—22 of the arm 6 of the flyer. The spindle 21 carries an elongated drum 25 of a length greater than the distance between the heads of a stationary supply reel 26 around which the drum is to travel in a rotary path.

Rotatably mounted on the outer extremity of the arm 7 of the flyer is a cylinder 27 having flanges 28—28, the upper flange thereof being positioned above the upper head of the supply reel 26 and its lower flange extending beneath the middle portion of the reel as clearly shown in Fig. 1. Secured at an angle in the end of the arm 8 of the flyer is a stud 30 upon which sheave 31 is free to rotate. Adjacent the hollow shaft 10 positioned centrally of the flyer, a depending lug 32 integral with the flyer carries a vertical sheave 33.

In the operation of the above described strand handling apparatus, the reel 26 having stored thereon a supply of strand 35 is placed on the floor or any other suitable support with its axis in vertical alignment with the axis of the flyer. A strand 35 from the supply reel 26 is directed around the drum 25, over the cylinder 27, the angularly positioned sheave 31 and the vertical sheave 33, in the order named, and thence up through the opening in the hollow shaft 40 to any conventional type of strand working mechanism (not shown). With the strand so directed to the strand working mechanism, the motor 17 is connected to a suitable source of electrical energy whereby the bevel gears 15—16 are driven to cause positive rotation of the drum 25 as it travels in a rotary path around the supply reel 26 to unwind the strand therefrom. By so directing the strand over the several rotary members carried by the flyer to a strand working mechanism in a direction axially of the supply reel, it will be readily seen that the drum as it travels in a rotary path about the stationary supply reel withdraws the strand in a tangentially unwinding direction therefrom without danger of snarling or kinking, while at the same time the positive rotation of the drum about its axis exerts a force longitudinally of the strand to facilitate its removal without entanglement or breakage when the strand sticks to or is bound by the other turns thereof on the supply reel. By employing the apparatus described, it is not necessary to exert a tension on the strand to rotate the supply reel to unwind the strand, and thus the apparatus is adaptable to high speed unwinding of fine strands; also, the strand may be positively withdrawn at any desired speed with a uniform tension to thus preclude any slack in or overrunning of the strand which might cause kinking thereof. By thus arranging the apparatus to withdraw a strand from a stationary supply reel, the problems and difficulties involved, particularly in the case of heavy and bulky supply reels of metal strands, in driving and controlling the centrifugal and inertia effects, are completely obviated.

It will be evident that the embodiment herein disclosed is merely illustrative and may be modified in many ways without departing from the scope and spirit of the invention as limited only by the appended claims.

What is claimed is:

1. In an apparatus for withdrawing a strand from a stationary supply thereof, a support freely revoluble about the supply, rotatable means carried by the support and revoluble therewith about the supply for withdrawing a strand therefrom and rotating and revolving in the same direction, and driving means to rotate the rotatable means positively.

2. In an apparatus for withdrawing a strand from a stationary supply thereof, a support freely revoluble about the supply, a rotatable strand guiding drum carried by the support, and means to rotate the drum positively in the same circular sense as the revolution of the support.

3. In an apparatus for withdrawing a strand from a stationary supply thereof, rotatable means to withdraw the strand from the supply, power driven means to rotate the rotatable means positively, a plurality of rotatable members to guide the strand in a predetermined path, and freely revoluble means revolving around the supply in the same circular sense as the rotatable strand withdrawing means and supporting the rotatable strand withdrawing means and the rotatable members.

4. In an apparatus for unwinding a strand from a stationary supply thereof, a positively driven and axially rotatable drum for applying a withdrawing force to the strand, means for driving the drum, and freely revoluble means to carry the drum in a circular path about the stationary supply of the strand in the same circular sense as the rotation of the drum.

5. In an apparatus for unwinding a strand from a stationary supply thereof, a freely revoluble member, rotatable strand withdrawing means carried by the member in a circular path around a supply of strand, and power driven means also carried by the member to drive the rotatable strand withdrawing means positively, the member revolving under the reaction of the withdrawing force exerted upon the strand in the same circular sense as the rotation of the rotatable strand withdrawing means.

6. In an apparatus for unwinding a strand from a stationary supply thereof, a member freely revoluble about a stationary supply of strand, positively driven means carried by the member and revoluble therewith around the supply of strand for engaging the strand and applying a withdrawing force thereto, and freely rotatable guide means carried by the member to receive and guide the strand from the positively driven means.

7. In an apparatus for unwinding strand from a stationary supply thereof, a freely revoluble member having a plurality of radial arms, a strand engaging drum mounted on one of the arms, rotatable strand guiding means mounted on the other arms, and means to rotate the strand engaging drum positively to apply a force longitudinally of the strand and thereby revolve the revoluble member about a stationary strand supply while unwinding a strand therefrom.

8. In a strand handling apparatus, a drum for engaging the strand, a rotatable cylindrical member for guiding the strand, a freely revoluble flier for supporting the drum and the cylindrical member, and power driven means carried by the flier for driving the drum, the flier revolving under the tension of the strand in the same circular sense as the rotation of the drum about a stationary supply of the strand.

HAROLD P. ARKEMA.
BRUNO M. A. TREBES.